(12) United States Patent
Wright et al.

(10) Patent No.: US 6,893,135 B2
(45) Date of Patent: May 17, 2005

(54) LIGHT GUIDES SUITABLE FOR ILLUMINATED DISPLAYS

(75) Inventors: John C. Wright, High Wycombe (GB); Andrew M. Hicks, Reading (GB); Bruno Mueller, Duesseldorf (GB)

(73) Assignee: 3M Innovative Properties Company, St. Paul, MN (US)

( * ) Notice: Subject to any disclaimer, the term of this patent is extended or adjusted under 35 U.S.C. 154(b) by 42 days.

(21) Appl. No.: 10/221,564

(22) PCT Filed: Feb. 14, 2001

(86) PCT No.: PCT/US01/04605
§ 371 (c)(1),
(2), (4) Date: Sep. 12, 2002

(87) PCT Pub. No.: WO01/71248
PCT Pub. Date: Sep. 27, 2001

(65) Prior Publication Data
US 2003/0223217 A1 Dec. 4, 2003

(30) Foreign Application Priority Data
Mar. 16, 2000 (GB) .............................. 0006327

(51) Int. Cl.⁷ ................................................ F21V 7/04
(52) U.S. Cl. ..................... 362/31; 362/558; 362/330; 362/26
(58) Field of Search ................................ 362/558, 561, 362/31, 330, 26, 27; 385/146

(56) References Cited

U.S. PATENT DOCUMENTS

| | | |
|---|---|---|
| 3,241,256 A | 3/1966 | Viret et al. |
| 5,262,928 A | 11/1993 | Kashima et al. |
| 5,289,351 A | 2/1994 | Kashima et al. |
| 5,363,294 A | 11/1994 | Yamamoto et al. |
| 5,377,084 A | 12/1994 | Kojima et al |
| 5,394,308 A | 2/1995 | Watanabe et al. |
| 5,600,462 A | 2/1997 | Suzuki et al. |
| 5,618,096 A | 4/1997 | Parker et al. |
| 5,641,219 A | 6/1997 | Mizobe . |
| 5,649,754 A | 7/1997 | Matsumoto |
| 5,667,289 A | 9/1997 | Akahane et al. |
| 5,736,686 A | 4/1998 | Perret, Jr. et al. |
| 5,816,677 A | 10/1998 | Kurematsu et al. |
| 5,876,107 A * | 3/1999 | Parker et al. .................. 362/31 |
| 5,882,774 A | 3/1999 | Jonza et al. |
| 5,944,405 A | 8/1999 | Takeuchi et al. |
| 6,099,134 A | 8/2000 | Taniguchi et al. |
| 6,364,497 B1 * | 4/2002 | Park et al. ..................... 362/31 |

FOREIGN PATENT DOCUMENTS

| | | |
|---|---|---|
| EP | 0 308 828 A | 3/1989 |
| EP | 0 377 309 | 7/1990 |
| EP | 0 490 279 A2 | 6/1992 |
| EP | 0 500 089 A | 8/1992 |
| EP | 0 293 182 B1 | 12/1993 |
| GB | 2 310 525 | 8/1997 |
| WO | WO 92/05535 | 4/1992 |
| WO | WO 94/29765 A | 12/1994 |
| WO | WO 97/01774 | 1/1997 |

OTHER PUBLICATIONS

Application Bulletin entitled "Thin Light Box," issued Mar., 1990 by 3M of St. Paul, MN, USA.

* cited by examiner

*Primary Examiner*—Stephen Husar
*Assistant Examiner*—Anabel Ton
(74) *Attorney, Agent, or Firm*—David B. Pattchet (57) ABSTRACT

A light guide (1) comprises a housing (3) defining a light-guiding optical cavity having first and second opposed major faces (5, 6), and a light source (11) arranged to direct light into the cavity from one end, to be guided between the major faces. The first major face (5) comprises a window through which light can be emitted from the optical cavity to be used, for example, for illuminating a graphic display. To improve the light distribution across that first major face (5), the second major face (6) comprises a sheet material (23) having a specularly-reflecting surface (24) that faces into the optical cavity and has diffusely-reflecting light-extraction elements (27) applied thereto in a predetermined configuration for causing light to be emitted from the optical cavity through the said window.

17 Claims, 5 Drawing Sheets

LIGHT GUIDES SUITABLE FOR ILLUMINATED DISPLAYS

FIELD OF THE INVENTION

The present invention relates to light guides suitable for use in illuminated displays.

BACKGROUND OF THE INVENTION

It is already known to use light guides to illuminate panels for general lighting purposes and for display applications (e.g. for illuminating signs and advertisements, and also for illuminating liquid crystal displays). In one form, often referred to as a light box, the light guide comprises a hollow box-shaped structure defining an optical cavity, and in another form it comprises a solid light-guiding plate. In both forms, a major surface of the guide can be illuminated by light directed into the guide in a direction generally parallel to that major surface, for example from at least one elongated light source located adjacent an edge of the light guide.

Light guides in the form of hollow light boxes are described, for example, in EP-A-0 490 279; 0 377 309; and 0 293 182; and in GB-A-2 310 525. In each of those light boxes, a prismatic optical film is employed with a view to achieving a more even distribution of light over the surface that is being illuminated. In addition, an Application Bulletin entitled "Thin Light Box" and issued in March 1990 by Minnesota Mining and Manufacturing Company of St. Paul, Minn., USA describes the design and construction of light boxes, using Scotch™ Optical Lighting Film in combination with a shaped sheet of V-5115 Scotch™ Light Extractor Film, for use in illuminating graphic displays.

In the case of light guides in the form of solid light-guiding plates, it is well known to form light-extraction elements of some type on the rear major surface of the plate with a view to achieving a more even distribution of light over the front surface (i.e. the surface that is being illuminated). In some cases, printed light-extraction elements are used and are applied directly to the rear surface of the light-guiding plate. Arrangements of that type are described, for example, in U.S. Pat. Nos. 5,736,686; 5,649,754; 5,600,462; 5,377,084; 5,363,294; 5,289,351; 5,262,928; 5,667,289; and 3,241,256.

U.S. Pat. No. 5,618,096 describes light-emitting panels of various types and mentions the possibility of providing light-extracting deformities on one or both sides of a panel to control the amount of light emitted from any area of the panel. It is also mentioned that the deformities may be printed on a sheet or film which is used to apply the deformities to the panel member. WO 92/05535 describes an illuminated display system comprising a transparent panel with a dot matrix applied to both sides and an opaque backing sheet attached to the rear side. An image to be illuminated is printed on a further sheet positioned on the front side of the panel.

As recognised in previous disclosures, the problems to be addressed in constructing a light guide for illumination purposes include achieving a uniform level of brightness across the panel that is being illuminated, and minimising the amount of power required to produce a level of illumination that is adequate having regard to the circumstances. As regards the first of those problems, it is often the case that the panel is more brightly illuminated in the area closest to the light source, which detracts from the overall visual appearance and effectiveness of the illumination. As regards the second of those problems, it is clearly highly desirable, from an environmental and a cost point of view, that the amount of power used for illumination purposes should be kept as low as possible. Moreover, when the power is derived from a battery (as may be the case when LCD and computer displays are being illuminated) it is also generally desirable that the amount of power utilized should be minimized so that the battery can be kept as small and light as possible.

In addition to those considerations, it would be advantageous to be able to produce, comparatively easily and in a cost-effective manner, light guides of widely-differing dimensions that would be suitable for use in a variety of situations but would, nevertheless, function with a high level of efficiency.

SUMMARY OF THE INVENTION

The present invention provides a light guide comprising a housing defining a light-guiding optical cavity having first and second opposed major faces, and at least one light source arranged to direct light into the cavity from one end, to be guided between the major faces; wherein the first major face comprises a window through which light can be emitted from the optical cavity, and the second major face comprises a sheet material having a specularly-reflecting surface that faces into the cavity and has diffusely-reflecting light-extraction elements applied thereto in a predetermined configuration for causing light to be emitted from the optical cavity through the said window.

The term "light extraction element" in this context indicates a structure capable of reflecting light at such an angle that it will be emitted from the optical cavity through the said window. In a preferred form, the light extraction elements are printed elements formed in a diffusely-reflecting material. As used herein, the term "printed" includes the case in which the diffusely-reflecting material is deposited by a conventional printing process involving temporary contact between a printing surface (in which the shape of at least one light extraction element is pre-defined) and the surface on which the light extraction elements are to be formed. It also includes the case in which the diffusely-reflecting material is deposited by being projected at predetermined locations onto the surface on which the light extraction elements are to be formed.

Light guides in accordance with the invention can be produced in different sizes using comparatively lower cost materials and in a manner that is appropriate to high volume production, and can enable the effective, uniform, and efficient illumination of display panels using available light sources.

BRIEF DESCRIPTION OF THE DRAWINGS

By way of example, embodiments of the invention will be described with reference to the accompanying drawings, in which.

DETAILED DESCRIPTION

Figure 1:
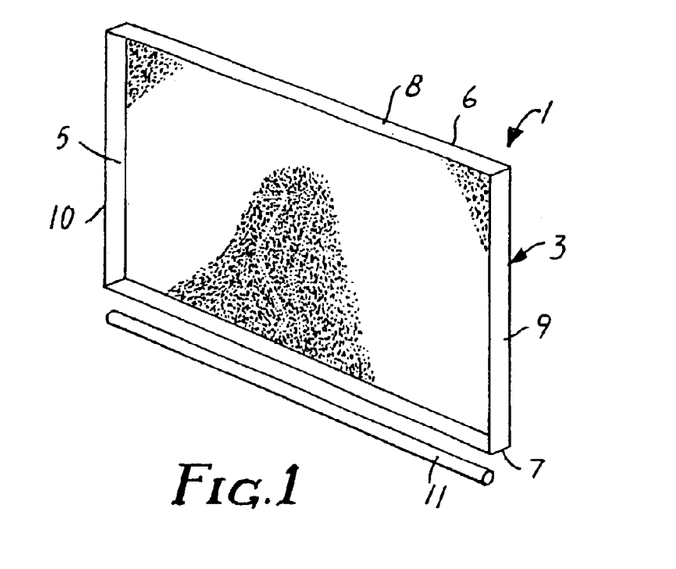
FIG. 1 is a perspective view of a light guide in accordance with the invention.

The light guide 1 shown in FIG. 1 comprises a box-like housing 3 defining an optical cavity. The housing 3 has opposed major faces 5, 6, and opposed narrow sides 7, 8 and 9, 10. An elongate light source 11 is arranged adjacent one of the narrow sides 7 to direct light into the optical cavity in a direction generally parallel to the planes of the major faces 5, 6. One of the major faces (the face 5) forms a window through which light can be emitted from within the optical cavity and used for illumination purposes.

Figure 3:
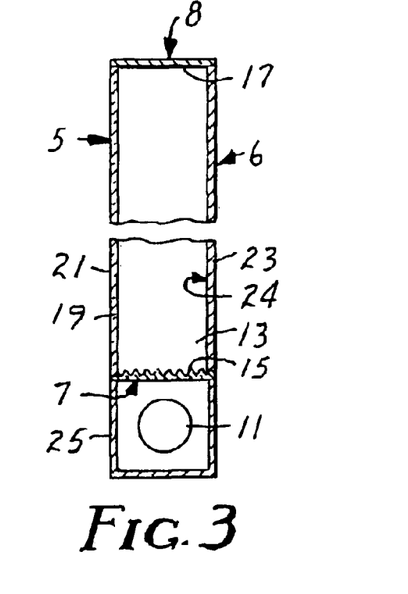
FIG. 3 is a diagrammatic cross-sectional view of the light guide in exploded form on the line III—III of FIG. 2.

The optical cavity 13 inside the housing 3 is visible in the diagrammatic illustration of FIG. 3. The narrow side 7 of the housing adjacent the light source 11 comprises an optical sheet material 15 forming a window through which light from the source 11 can enter the light guide 1. Preferably, the sheet material 15 has a structured surface on the side remote from the light source, to redirect the light from the source 11 and ensure that the light that passes through this window enters the optical cavity 13 preferentially in a direction generally parallel to the planes of the faces 5, 6. The optical sheet material 15 may, for example, have a structured surface comprising a series of ridges and grooves formed by a plurality of parallel triangular prisms. A similar use of sheet material of that type is described in EP-A-0 293 182. In the light guide 1, the material 15 is preferably oriented so that the prisms extend parallel to the elongate light source. Suitable sheet material is available, under the trade designation "Scotch™ Optical Lighting Film" from Minnesota Mining and Manufacturing Company of St. Paul, Minn., USA.

The narrow side 8 of the light guide 1 opposite the window 15 has a reflecting surface 17 on the side facing into the optical cavity 13. This reflecting surface, which is preferably a highly-efficient specularly-reflecting surface, can be provided by any suitable material but is preferably provided by a multi-layer optical film of the type described in U.S. Pat. No. 5,882,774 and WO97/01774. A suitable alternative material is a silver reflective film, for example the film available under the trade designation "Silverlux", from Minnesota Mining and Manufacturing Company of St. Paul, Minn., USA.

The other two opposed narrow sides 9, 10 of the light guide also have reflecting surfaces 18 facing into the cavity. In this case, the reflecting surfaces are preferably provided by a film material available, under the trade designation "Light Enhancement Film" from Minnesota Mining and Manufacturing Company of St. Paul, Minn., USA. However, any other suitable reflecting material can be used: generally, it has been found that a diffusely-reflecting material is preferable when the length/width ratio of these narrow sides is less than 10 and that a specularly-reflecting material is preferable when this ratio is greater than 10. It will be appreciated that this ratio corresponds to the length/thickness ratio of the light guide 1 (otherwise known as its "aspect ratio").

Figure 2:
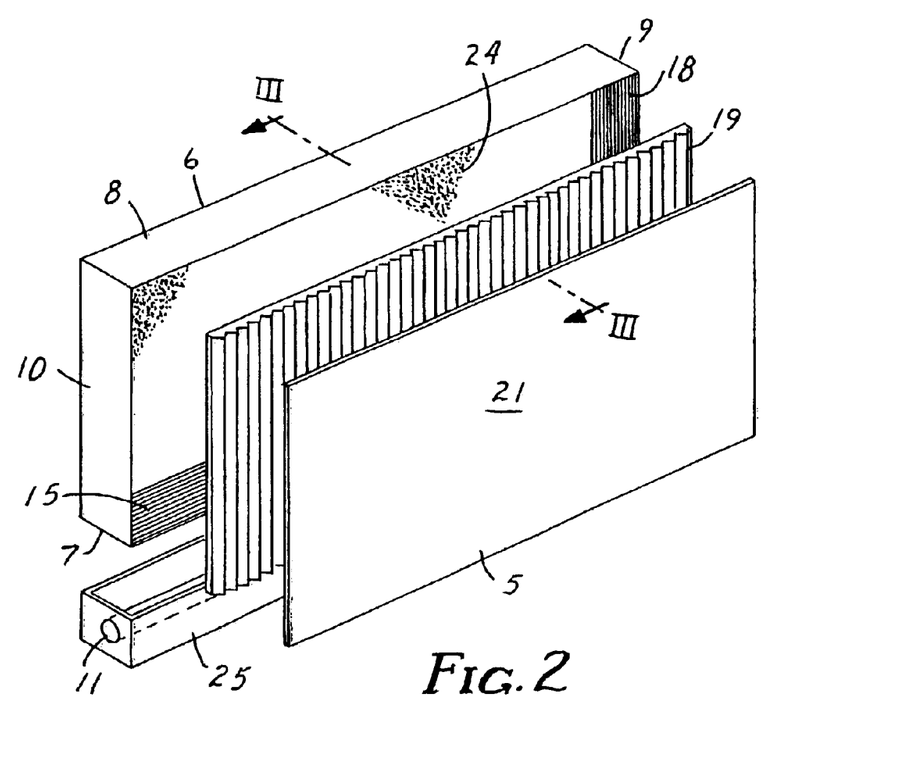
FIG. 2 is a diagrammatic perspective view of a light guide, similar to that shown in FIG. 1, the light guide being shown partly exploded.

The front face, or window, 5 of the light guide comprises an optical sheet material 19 that, preferentially, guides the light from the source 11 along the optical cavity 13 between the faces 5, 6 and permits light to leave the optical cavity only when it is incident on the material 19 at certain angles. More specifically, the sheet material 19 has a smooth surface facing into the optical cavity and, on the side facing away from the optical cavity, a structured surface comprising a series of ridges and grooves formed by a plurality of parallel triangular prisms whereby light incident on the material 19 while travelling along the optical cavity 13 will be totally internally reflected provided it is incident on the material 19 within a predetermined angular range. As such, the material 19 may be the same as the material 15 and, in this case, the material is oriented so that the prisms extend in a direction at right angles to the direction of extent of the light source 11 as indicated in FIG. 2. A similar use of material of that type is described in EP-A-0 293 182. To protect the prismatic structures on the sheet material 19, a further panel 21 may be positioned adjacent the material 19 on the outside of the light guide housing. This further panel is not essential but, when provided, it may comprise a sheet of opalescent light-diffusing material to enhance even further the uniformity of the light that passes through the sheet material 19.

The rear face 6 of the light guide 1 comprises a sheet material 23 which provides a highly-efficient specularly-reflecting surface 24 facing into the optical cavity 13. The reflecting surface 24 should be such that its reflectivity is not reduced substantially for light that is incident in directions other than normal to the surface, and is at least 90% (preferably at least 98%). Preferably, the sheet material 23 is a multi-layer optical film of the type described in U.S. Pat. No. 5,882,774 and WO 97/01774. A suitable alternative material, particularly for light guides that have a comparatively low aspect ratio (less than about 10), is available, under the trade designation "Silverlux", from Minnesota Mining and Manufacturing Company of St. Paul, Minn., USA.

Figure 4:
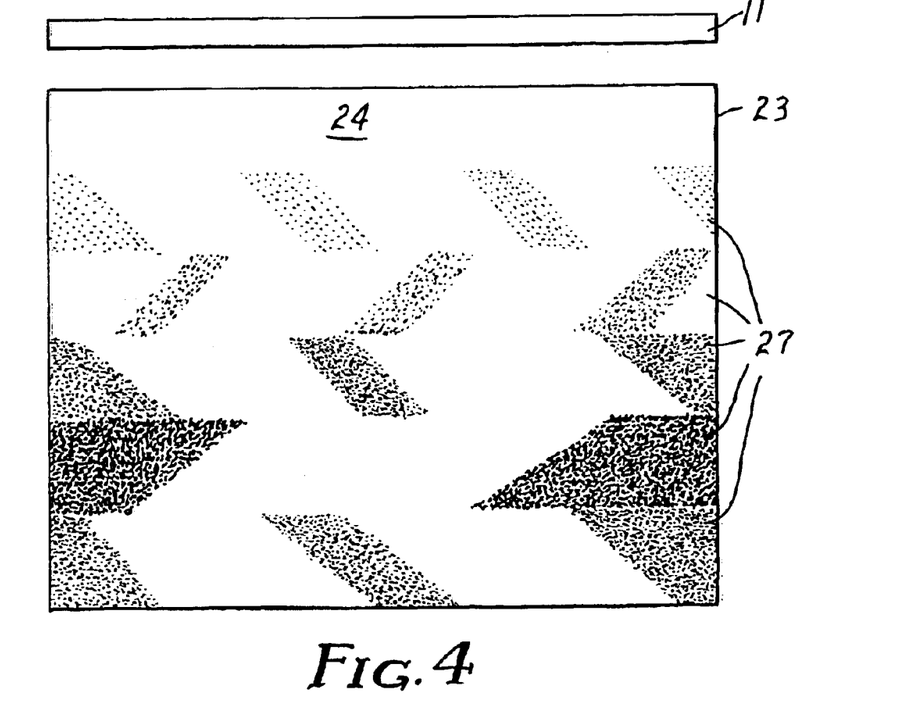
FIG. 4 illustrates the rear face of a light guide of the type shown in FIGS. 1 to 3.

As described in greater detail below, the specularly-reflecting surface 24 carries diffusely-reflecting light-extraction elements in a predetermined configuration to cause light to be emitted from the optical cavity 13, through the window 5, in a controlled manner. In this case, the light-extraction elements comprise an array of dots 27 formed in a diffusely-reflecting material on the surface 24 as shown in FIG. 4.

In FIGS. 2 and 3, the light source II is shown as being located in a three-sided housing 25, the open side of which is positioned adjacent the sheet material 15 forming the entry window of the light guide 1. The housing 25 is constructed with a view to ensuring that the light source 11 directs as much light as possible into the optical cavity 13 and, to that end, the internal surfaces of the housing may be covered with a suitable highly-efficient, diffusely reflecting material, for example a reflective paint or sheet material. Alternatively, the light source 11 could be provided with a parabolic reflector to direct the light from the source towards the optical cavity 13, or it could be replaced by a suitable apertured light source. The use of the sheet material 15 in the narrow side 7 of the light guide housing adjacent the light source 11, although preferred, is not essential.

The light guide 1 as described above functions as follows. Light from the source 11 (possibly following reflection or redirection at the walls of the housing 25) enters the optical cavity 13 through the window material 15 and travels preferentially in a direction parallel to the major surfaces 5, 6 of the light guide towards the surface 17 where it will be reflected and returned. However, any light that is incident on the extraction elements on the rear surface 24 (i.e. the dots 27) will be diffusely reflected and some of that light will, as a consequence, impinge on the front face 5 of the light guide at such an angle that it can pass through the optical sheet material 19 and emerge from the light guide.

The use of light-extraction elements of various forms to cause light to be emitted from light guides is already well known. In the light guide of FIGS. 1 to 3, the light-extraction elements 27 (as already mentioned) comprise an array of dots formed in a diffusely-reflecting material on the specularly-reflecting surface 24. The circular form of the light extraction elements is not essential, however, and they may be of any shape (for example squares, triangles, lines, etc) that can readily be formed by a printing process, and may even comprise a mixture of shapes and/or sizes. Light-extraction elements in the form of continuous lines on the reflecting surface 24 are also possible. Preferably, the light-extraction elements 27 are formed by being printed directly onto the reflecting surface 24 but they could, as an alternative, be printed on a transparent sheet which is then adhered to the surface 24. Moreover, although the use of printed light extraction elements is preferred, other forms could be employed as described below.

Figure 5:
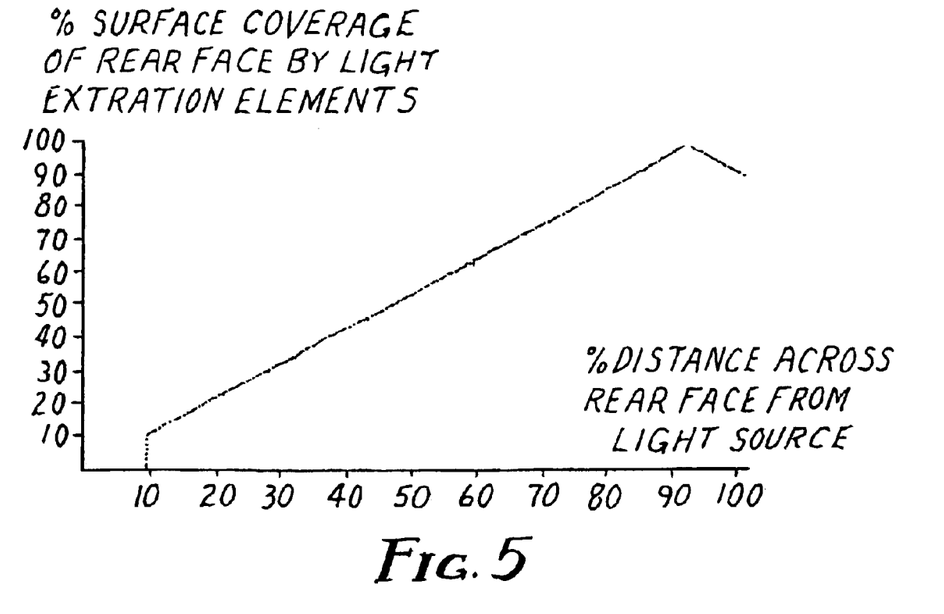
FIG. 5 is a graph illustrating a characteristic of the rear face of a light guide of the type shown in FIGS. 1 to 3.

The printed light extraction elements 27 on the reflecting surface 24 of the light guide 1 are positioned to provide a required illumination pattern over the front face 5 of the light guide. In many cases, a uniform illumination of the face 5 is required and that can be achieved if the percentage area of the surface 24 that is covered by the diffusely-reflecting elements 27 varies (most typically, increases) with the distance from the light source 11 (measured in the direction at right angles to the direction of extent of the light source). That is illustrated diagrammatically in FIG. 4, in which it will be seen that the proportion of the surface 24 of the sheet material 23 that is covered by the light extraction elements 27 is zero in the region immediately adjacent the light source 11 and then increases as the distance from the light source increases. In FIG. 4, the surface coverage of the light extraction elements 27 is shown reaching a maximum value at a short distance from the other end of the sheet 23 and then decreasing slightly in the region furthest from the light source 11. This decrease is provided to accommodate the effects of the reflective surface 17 at the far end of the optical cavity 13; the need for it (and its extent), will be determined in each case by the particular configuration of the light guide. It should be understood that FIG. 4 is purely diagrammatic and that the variation in the surface-coverage of the light-extraction elements 27 would typically be continuous rather than discontinuous as shown in this drawing. A more typical variation in the surface-coverage of the light-extraction elements 27 is illustrated in FIG. 5 which shows that the surface coverage is zero over the first 10% of the length of the optical cavity 13 measured from the light source 11 and then increases linearly, reaching 100% (i.e. total coverage) at a distance of about 90% of the length of the optical cavity measured from the light source. The surface coverage then decreases slightly at the end of the optical cavity 13 remote from the light source 11.

Figure 6:
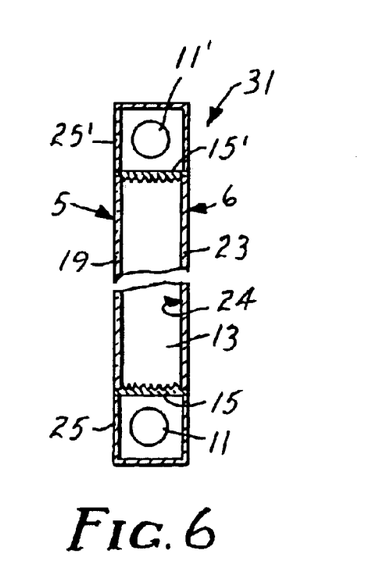
FIGS. 6 and 7 are views, similar to FIGS. 3 and 4, of another light guide and of the rear face of that light guide.
Figure 7:
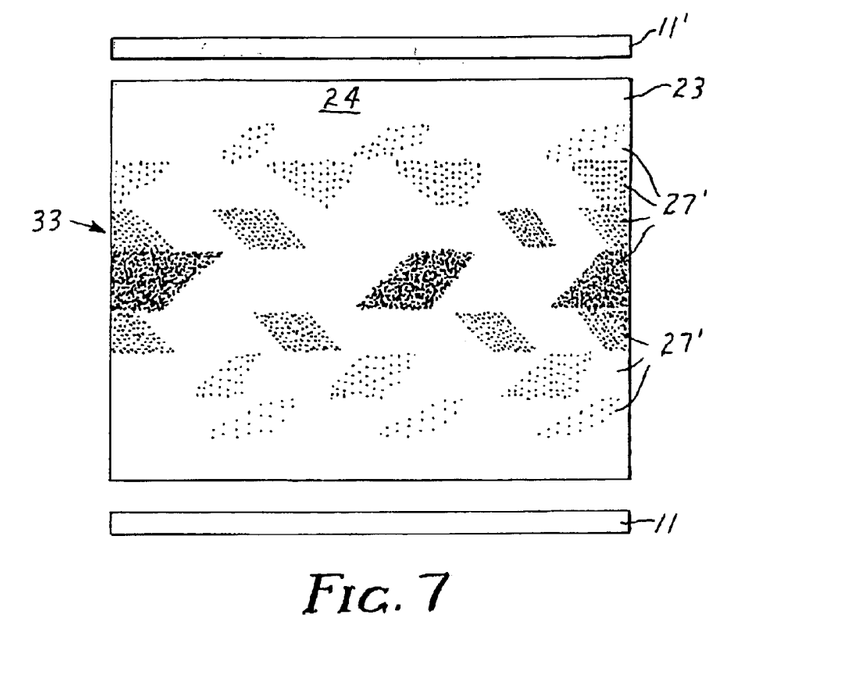

FIGS. 6 and 7 illustrate a light guide 31 that is generally similar to the guide illustrated in FIGS. 2 to 4 but utilises an additional light source 11' positioned opposite to the light source 11 (i.e. adjacent the narrow side 8 of the housing 3). To enable light from the source 11' to enter the optical cavity 13, the side 8 of the housing 3 comprises an optical sheet material 15' forming a window, rather than the reflecting material 17 of FIG. 3. In addition, the rear surface 24 of the light guide is provided with a suitably-modified configuration of light-extraction dots 27', described in greater detail below.

The light source 11' is located in a three-sided housing 25' similar to that of the light source 11 but, like the light source 11, it could alternatively be provided with a parabolic reflector to direct light from the source into the optical cavity, or be replaced by a suitable apertured light source. The material 15' forming the window from the housing 25' into the optical cavity 13 is preferably the same as the optical sheet material 15.

The light guide 31 functions in a similar manner to the guide 1 described above except that, in this case, light from both sources 11, 11' (possibly following reflection or redirection at the walls of the associated housing 25, 25') enters the optical cavity 13 through the associated window material 15, 15' and travels preferentially in a direction parallel to the major surfaces 5,6 of the light guide towards the light housing at the other end of the optical cavity where some of the light will be reflected and returned. Any light that is incident on the extraction elements on the rear surface 24 (i.e. the dots 27') will be diffusely reflected and some of that light will, as a consequence, impinge on the front face 5 of the light guide at such an angle that it can pass through the optical sheet material 19 and emerge from the light guide.

Figure 8:
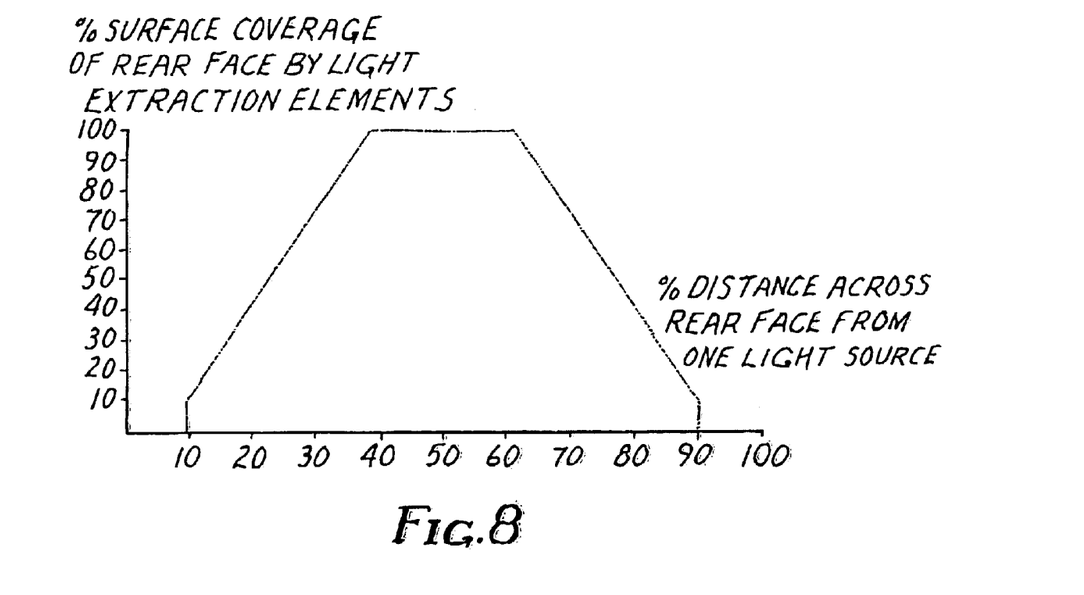
FIG. 8 is a graph, similar to FIG. 5, for the rear face shown in FIG. 7.

As with the light guide 1 of FIGS. 2 to 4, the printed light extraction dots 27' on the reflecting surface 24 of the light guide 31 are positioned to provide a required illumination pattern over the front face 5 of the light guide. In many cases, a uniform illumination of the face 5 is required and that can be achieved if the percentage area of the surface 24 that is covered by the diffusely-reflecting dots 27' varies (most typically, increases) with the distance from each of the light sources 11, 11' (measured in the direction at right angles to the direction of extent of the light sources) up to a maximum in the central region equidistant from both light sources. That is illustrated diagrammatically in FIG. 7, in which it will be seen that the proportion of the surface 24 of the sheet material 23 that is covered by the light extraction elements 27' is zero in the regions immediately adjacent the light sources 11, 11' and then increases in each case as the distance from the respective light source increases, reaching a maximum value in the central region 33 of the surface. It should be understood that FIG. 7 is purely diagrammatic and that the variation in the surface-coverage of the light-extraction dots 27' would typically be continuous rather than discontinuous as shown in this drawing. A more typical variation in the surface-coverage of the light-extraction elements 27' is illustrated in FIG. 8 which shows that the surface coverage is zero over the first 10% of the length of the optical cavity 13 measured from each of the light sources 11, 11' and then increases linearly, reaching 100% (i.e. total coverage) in a central region at a distance approaching 40% of the length of the optical cavity measured from each light source.

FIGS. 4 and 7 both indicate that the surface-coverage provided by the light-extraction elements 27, 27' is varied by changing the number of dots per unit area of the surface 24 while maintaining a uniform dot size. As an alternative, the size of the extraction elements can be changed while maintaining a constant number of extraction elements per unit area of the surface 24 and, as a further alternative, both the size of the extraction elements and the number per unit area can be varied.

In some cases, it may also be appropriate to vary the surface-coverage of the light extraction elements 27, 27' transversely of the optical cavity (i.e. in a direction parallel to the direction of extent of the light source(s) 11, 11').

The extraction elements 27, 27' of FIGS. 4 and 7 can be printed using any suitable printing medium that will function as a diffuse reflector and is compatible with the reflecting surface 24 and with the printing process employed. One suitable medium is a highly-efficient diffusely-reflecting matt white ink. Any suitable printing process can be used to deposit the printing medium on the surface of the sheet material, including screen printing, gravure printing, offset printing. Ink jet printing may also be employed. In a preferred process, the printing medium is deposited using a conventional silk screen printing process because that is a versatile, comparatively low-cost process which is suitable for long production runs but nevertheless enables good control to be maintained over the size of the extraction elements 27, 27'. The extent to which the reflecting surface 24 should be covered by the printing medium can be determined empirically for a particular light guide by providing an arbitrary, linearly-varying, pattern of extraction elements 27, 27' on the surface 24 and comparing the resulting illumination of the front face 5 of the light guide with that achieved in the absence of any extraction elements. The pattern is then adjusted, on the basis of that comparison to yield the illumination required.

Although it is generally required to achieve a constant level of illumination across the front face 5 of the light guide 1, 31 there may be occasions when it is desirable to provide a level of illumination that varies across the face 5 in a predetermined manner. For example, the level of illumination across the front face 5 could be matched to the image that is being illuminated so that the brighter parts of the image receive more light and the darker parts of the image receive less. That could be achieved, for example, by first providing, on the reflecting surface 24, the pattern of extraction elements 27, 27' required to provide uniform illumination of the front face 5 and subsequently superimposing, on that pattern, further extraction elements arranged in an image-dependent configuration. The further extraction elements could, for example, be printed directly over the elements 27, 27' or they could be printed on a separate transparent sheet which is then adhered to the already-printed surface 24. As an alternative, the further extraction elements could be provided on the smooth surface of the optical sheet material 19 in the front face 5 of the light guide, in which case they should be formed of a translucent material, capable of both reflecting and transmitting incident light from within the optical cavity 13. As a further alternative, the extraction elements 27, 27' could be omitted from the reflecting surface 24 (at least in certain areas) with only the further, image-related, extraction elements being provided.

Figure 9:
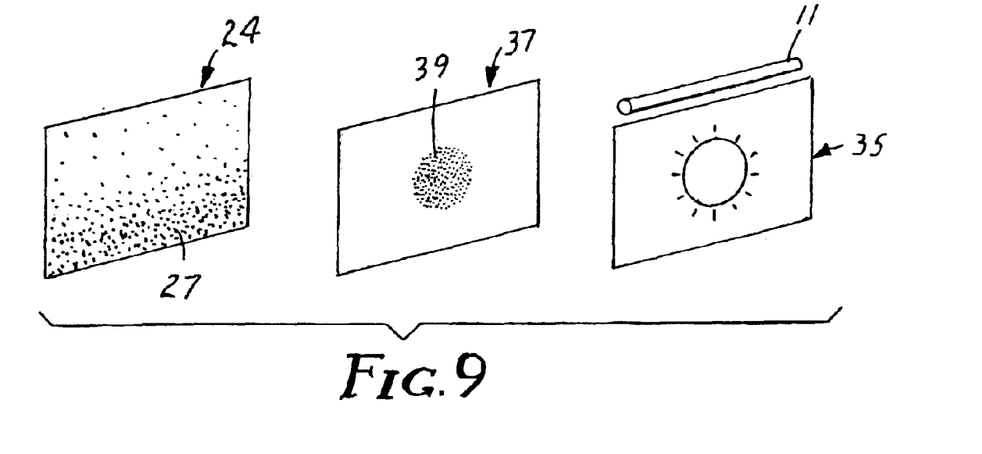
FIG. 9 illustrates a modification of the light guide of FIGS. 2 and 3.

An arrangement of the type referred to in the previous paragraph is illustrated diagrammatically in FIG. 9, for a light guide intended to be illuminated by a single light source 11 as in FIGS. 2 and 3. The reflecting surface 24 carrying the pattern of extraction elements 27 required to provide uniform illumination of the front face of the light guide is shown, in combination with a sheet 35 carrying the graphic image to be illuminated. Superimposed on the reflecting surface 24 is a transparent sheet 37 carrying further extraction elements 39 arranged in an image-related configuration whereby the brighter parts of the image receive more light and the darker parts of the image receive less. Typically, the graphic image on the sheet 35 is a digitally-printed image, in which case the image data file that is used to print the image can also be used to print the extraction elements 39 on the sheet 37 taking account, if required, of factors such as the nature of the inks used in the graphic image and the spectral sensitivity of the human eye.

Although FIG. 9 shows the further extraction elements 39 located on the separate sheet 37, it will be understood that they could alternatively be located on the reflecting surface 24. In that case, when using a digital printing process, all of the required light extraction elements (i.e. elements 27 as well as elements 39) can readily be deposited on the surface 24 together.

The use of a sheet material 23 for the rear face of the optical cavity 13 of the light guides 1, 31 is advantageous because such a material is easy to handle, not only during the actual printing process (when the fact that the sheet material has flat, unstructured, surfaces is a particular advantage) but also during any subsequent drying and storage stages prior to assembly of the light guide. When in use in the light guide, the reflective sheet material 23 prevents light from leaving the optical cavity 13 through the rear face 6 and thus enhances the illumination of the front face 5. In addition, any scratches on the surface of the reflective sheet material (which might arise, for example, during handling or assembly of the light guide) will not adversely affect the illumination of the front face 5. Moreover, because the extraction elements 27 are printed on a planar reflecting surface 24 there is also no risk of more interference patterns arising even when the extraction elements are disposed in a regular array.

The printing medium used to form the extraction elements 27, 27' is selected for compatibility with the sheet material to which it is applied, as well as for its durability and diffusely-reflecting characteristics. Highly-opaque white inks are preferred and it has been found that the best printing quality is obtained using UV-cured inks in a screen printing process. Screen printing offers the further advantage that the ink layer deposited on the sheet material 23 is thick and, consequently, comparatively robust and also less likely to fade and discolour. Moreover, unlike some printing processes, the screen printing process does not entail the application of high pressures to the material 23 and is less likely to damage the latter. It can also be used to apply the printing medium to a wide range of different sheet materials in a wide range of sizes. It should be understood, however, that other media could be employed to form the light extraction elements 27, 27', as could other processes including, for example, laser printing, ink jet printing, thermal transfer printing and thermal ink jet printing.

In some cases, the extraction elements 27, 27' may be formed by other methods, including, for example, surface roughening of the sheet material or deposition of diffusely-reflecting material (which may include particles) in a required configuration using coating or spraying processes.

A hollow light guide as described above with reference to FIGS. 1 to 3 or 6 can be fabricated in such a way that it is comparatively lightweight. That is a particular advantage when the light guide is large in size (for illuminating large signs, for example), and especially when it is required to be installed in a less accessible location. It also makes the use of thicker light guides (which offer the possibility of admitting more light into the optical cavity 13) more practical. It is also comparatively simple to fabricate light guides of this type in many different sizes and, in particular, with widely differing aspect ratios (i.e. different length/thickness ratios). For example, light guides of this type can be produced with aspect ratios as small as 5 and as large as 100 and, in both cases, will function efficiently. Light guides with small aspect ratios offer the advantage that the light admitted to the optical cavity 13 undergoes fewer reflections before it is emitted through the window 5. Consequently, the level of accuracy required in the configuration of the light extraction elements 27, 27' is lower.

Of particular interest in the field of illuminated signs is the fact that light guides of the type shown in FIGS. 1 to 3 and 6 can be fabricated with widths as small as 10 cm and even, depending on the size of the sign, as small as 3 cm. Light guides of this type, having low aspect ratios (typically less than 10) and using conventional fluorescent tubes as light sources, have been found to have performance efficiencies that compare favourably (and, in some cases, very favourably) with those that can be achieved using solid light guides. In the alternative case in which the light guides have larger aspect ratios, they are found to be better able than solid light guides to accommodate some degree of misalignment of the light source.

The light sources employed with the light guides 1, 31 are not required to have an elongate form as illustrated. Other light sources could be employed including, for example, light emitting diodes (LEDs) Depending on the form of the light source, more than one source may be used to direct light into the optical cavity 13 through the adjacent side of the housing 3. In that case, the surface-coverage of the light extraction elements 27, 27' may also vary transversely of the optical cavity (i.e. between the sides 9, 10).

The light guides illustrated in FIGS. 1 to 3 and 6 have been described above as being used to illuminate a graphic display but they could be used for other purposes including, for example, to illuminate liquid crystal displays.

An example of an illuminated sign incorporating a light guide of the type illustrated in FIGS. 1 to 3 will now be described.

The housing 3 of the light guide 1, excluding the front major face 5, may be a one-piece vacuum-formed construction of any suitable material, for example PVC (polyvinylchloride). Alternatively, the housing may be formed from several pieces of, for example, an acrylic material, each providing one side of the housing, which are secured together in any suitable manner. The housing is approximately 60×60×4.5 cm.

The internal surface of the rear major face 6 of the housing is covered with a sheet 23 of a specularly-reflective, multi-layer, optical film of the type described in U.S. Pat. No. 5,882,774 and WO 97/01774, having a reflectivity in a direction normal to the surface of the film of at least 98%. The surface 24 of the film 23 facing into the housing 3 carries a printed dot pattern providing a percentage surface coverage that varies as represented in FIG. 5. The dot pattern was screen printed on the surface 24 of the film 23 using a white UV-cured ink of a type formulated for the printing of compact discs (a suitable ink being available from NOR-COTE of Eastleigh, Hampshire, England). The variation in percentage surface coverage of the surface 24 by the ink was achieved by varying the size of the dots while maintaining a constant number of dots per unit area of the surface (based on transverse lines of dots containing about 20 dots per inch (2.54 cm)).

The internal surface of one narrow side 7 of the housing 3 is covered with a sheet 15 of the above-mentioned "Scotch™ Optical Lighting Film", arranged with the prisms facing into the housing and extending parallel to the long edges of this side of the housing. The internal surface of the opposite narrow side 8 of the housing 3 is covered with the same specularly-reflective film material as the internal surface of the rear major face 6 but without the printed dot pattern. The internal surfaces of the remaining two narrow sides 9, 10 of the housing 3 are covered with the above-mentioned "Light Enhancement Film".

The housing 3 is closed with a sheet 19 of the above-mentioned "Scotch™ Optical Lighting Film", forming the front major face 5. The film is arranged so that the prisms are on the outside of the housing and extend between the narrow sides 7 and 8.

The light guide module thus formed was put into a sign housing and provided with a 60 cm long, 14W fluorescent lighting tube located, within a high-reflectance housing 25, adjacent the narrow side 7 of the light guide housing 3 and arranged to direct light into the latter. It was found that the front major face 5 of the housing 3 was illuminated with a high degree of uniformity and to a level sufficient to provide effective illumination of a graphic image located in front of the face 5.

What is claimed is:

1. A light guide comprising a housing defining a light-guiding optical cavity having first and second opposed major faces, and at least one light source arranged to direct light into the cavity from one end, to be guided between the major faces; wherein the first major face comprises a window through which light can be emitted from the optical cavity, and the second major face comprises a sheet material having a specularly-reflecting surface that faces into the cavity and has diffusely-reflecting light-extraction elements applied thereto in a predetermined configuration for causing light to be emitted from the optical cavity through the said window.

2. A light guide as claimed in claim 1, in which the specularly-reflective surface has a reflectivity of at least 90% for light incident on the surface at any angle.

3. A light guide as claimed in claim 1, in which the sheet material having the specularly-reflecting surface is laminated to an internal surface of the housing.

4. A light guide as claimed in claim 1, in which the light-extraction elements are printed elements formed in a diffusely-reflecting material.

5. A light guide as claimed in claim 4, in which the light-extraction elements are printed directly on the specularly-reflecting surface.

6. A light guide as claimed in claim 1, in which the percentage area of the specularly-reflecting surface that is covered by light extracting-elements is not constant over the whole area second major face.

7. A light guide as claimed in claim 6, in which, in any region of the second major surface, the percentage area of the specularly-reflecting surface that is covered by light extracting-elements varies with the distance of that region from the light source.

8. A light guide as claimed in claim 1, including a second light source arranged to direct light into the cavity from the end opposite the first-mentioned light source, to be guided between the major faces.

9. A light guide as claimed in claim 1, in which the first major face has a structured surface comprising a plurality of parallel prisms on the side remote from the optical cavity.

10. A light guide as claimed in claim 1, in which a display that is to be illuminated is positioned in front of the window.

11. A light guide as claimed in claim 10, in which at least some of the, diffusely-reflecting light-extraction elements are applied to the specularly-reflecting surface in a configuration that is related to the display.

12. A light guide as claimed in claim 10, including diffusely-reflecting light-extraction elements applied to the window, on the side facing into the optical cavity, in a configuration that is related to the display.

13. A light guide as claimed in claim 1, wherein said light source is an elongate light source arranged adjacent an edge of said housing.

14. A light guide as claimed in claim 1, wherein said housing includes an optical sheet material adjacent said light source that forms a window through which light from the light source can enter the light guide.

15. A light guide as claimed in claim 14, wherein said optical sheet material adjacent said light source has a structured surface on the side remote from the light source.

16. A light guide as claimed in claim 1, wherein said optical cavity first major face comprises an optical sheet material having a smooth surface facing into the optical cavity and a structured surface comprising a series of ridges and grooves facing away from the optical cavity.

17. A light guide as claimed in claim 1, wherein said specularly-reflective surface has a reflectivity of at least 98% for light incident on the surface at any angle.

* * * * *